US006415296B1

(12) United States Patent
Challener et al.

(10) Patent No.: US 6,415,296 B1
(45) Date of Patent: Jul. 2, 2002

(54) METHOD AND SYSTEM FOR MORE EFFICIENTLY PROVIDING A COPY IN A RAID DATA STORAGE SYSTEM

(75) Inventors: David Carroll Challener, Raleigh; Shah Mohammed Rezaul Islam, Cary; Vikram Harakere Krishnamurthy, Durham; Philip Anthony Richardson, Apex, all of NC (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,715

(22) Filed: Mar. 31, 1999

(51) Int. Cl.$^7$ .............................................. G06F 17/30
(52) U.S. Cl. ........................ 707/200; 707/204; 711/162
(58) Field of Search ................................ 707/200–204; 717/11; 711/162

(56) References Cited

U.S. PATENT DOCUMENTS 5,790,773 A * 8/1998 DeKoning et al. .............. 714/6
6,038,570 A * 3/2000 Hitz et al. .................. 707/204
6,058,054 A * 5/2000 Islam et al. ................. 365/200
6,138,126 A * 10/2000 Hitz et al. .................. 707/202
6,304,941 B1 * 10/2001 Lyons et al. ................ 711/114

OTHER PUBLICATIONS

Patterson et al., A Case for Redundant Arrays of Inexpensive Disks (RAID), ACM SIGMOD Conference, Jun. 1988.*

* cited by examiner

Primary Examiner—Sanjiv Shah
Assistant Examiner—Jean Bolte Fleurantin
(74) Attorney, Agent, or Firm—J. Bruce Schelkopf; Sawyer Law Group, LLP

(57) ABSTRACT

The present invention provides a method and system for more efficiently providing a copy of a portion of a source drive of a plurality of drives in a redundant array of inexpensive disks (RAID) data storage system. The portion of the source drive includes a plurality of segments. The method and system include providing the copy of the plurality of segments from the source drive to the target drive. The plurality of segments can be modified during the step of providing the copy. The method and system further include providing another copy of a portion of the plurality of segments that have been modified since the step of providing the copy commenced if a portion of the plurality of segments have been modified since copying commenced.

16 Claims, 10 Drawing Sheets

METHOD AND SYSTEM FOR MORE EFFICIENTLY PROVIDING A COPY IN A RAID DATA STORAGE SYSTEM

CROSS REFERENCE TO RELATED APPLICATIONS

The present application is related to co-pending U.S. patent application Ser. No. 09/281,561 filed on Mar. 31, 1999, issued as U.S. Pat. No. 6,058,054 on May 2, 2000, and assigned to the assignee of the present application.

FIELD OF THE INVENTION

The present invention relates to data storage systems and more particularly to a method and system for more efficiently providing an instant copy of a portion of a RAID (redundant array of inexpensive disks) data storage system.

BACKGROUND OF THE INVENTION

In order to store data, some computer systems use a redundant array of inexpensive disks ("RAID") data storage subsystem. For example, a RAID subsystem may be coupled with a host or server that services clients on a network. The RAID subsystem typically includes a controller and a plurality of disk drives. The controller generally controls operations of the RAID subsystem. Information is physically stored on the drives.

It may be desirable to copy the information that is stored on the RAID subsystem and that is being used via the host. For example, the data stored on one or more of the drives may be backed up to ensure that the data is available in the case that the RAID subsystem malfunctions. The drive from which the backup is desired is known as the source drive. In order to copy a portion of the data stored on the source drive of the RAID subsystem, the files that are desired to be copied are closed. Thus, no input to or output from the files on the source drive is allowed during copying. This ensures that the data on the source drive does not change during the copying procedure. The desired files on the source drive are then copied progressively to another location. This location may be another drive, called a target drive. Typically, the organization of the source drive is also copied. Thus, the target drive may include directories and subdirectories containing copied files. The copies on the target drive can then be accessed separately from the originals on the source drive. The drive being copied is then released, allowing input to and output from the files.

Although the conventional method for providing a copy functions, it may take a long time to copy the files from the source drive to the target drive. This is particularly true where there is a great deal of data to be copied. For example, a large database may be backed up periodically. During the conventional copying procedure, the source drive cannot be accessed via the host. Thus, users of the system may be precluded from reading, modifying, or otherwise utilizing the data in the database for a relatively long time. Users cannot access the data to modify even a small portion of the data.

Accordingly, what is needed is a system and method for more rapidly generating a copy of data on a RAID subsystem. It would also be desirable if the method and system for generating the copy had a relatively low impact on system performance. The present invention addresses such a need.

SUMMARY OF THE INVENTION

The present invention provides a method and system for more efficiently providing a copy of a portion of a source drive of a plurality of drives in a redundant array of inexpensive disks (RAID) data storage system. The portion of the source drive includes a plurality of segments. The method and system comprise progressively providing the copy of the plurality of segments from the source drive to the target drive. The plurality of segments can be modified during the step of providing the copy. The method and system further comprise providing another copy of a portion of the plurality of segments that have been modified since the step of providing the copy commenced if a portion of the plurality of segments have been modified since copying commenced.

According to the system and method disclosed herein, the present invention decreases the time required to provide the copy while allowing users to read from or write to the source drive or target drive during copying. Thus, the reading and writing during the copying procedure is performed at a faster rate.

DETAILED DESCRIPTION OF THE INVENTION

The present invention relates to an improvement in a redundant array of inexpensive disks ("RAID") data storage subsystem. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
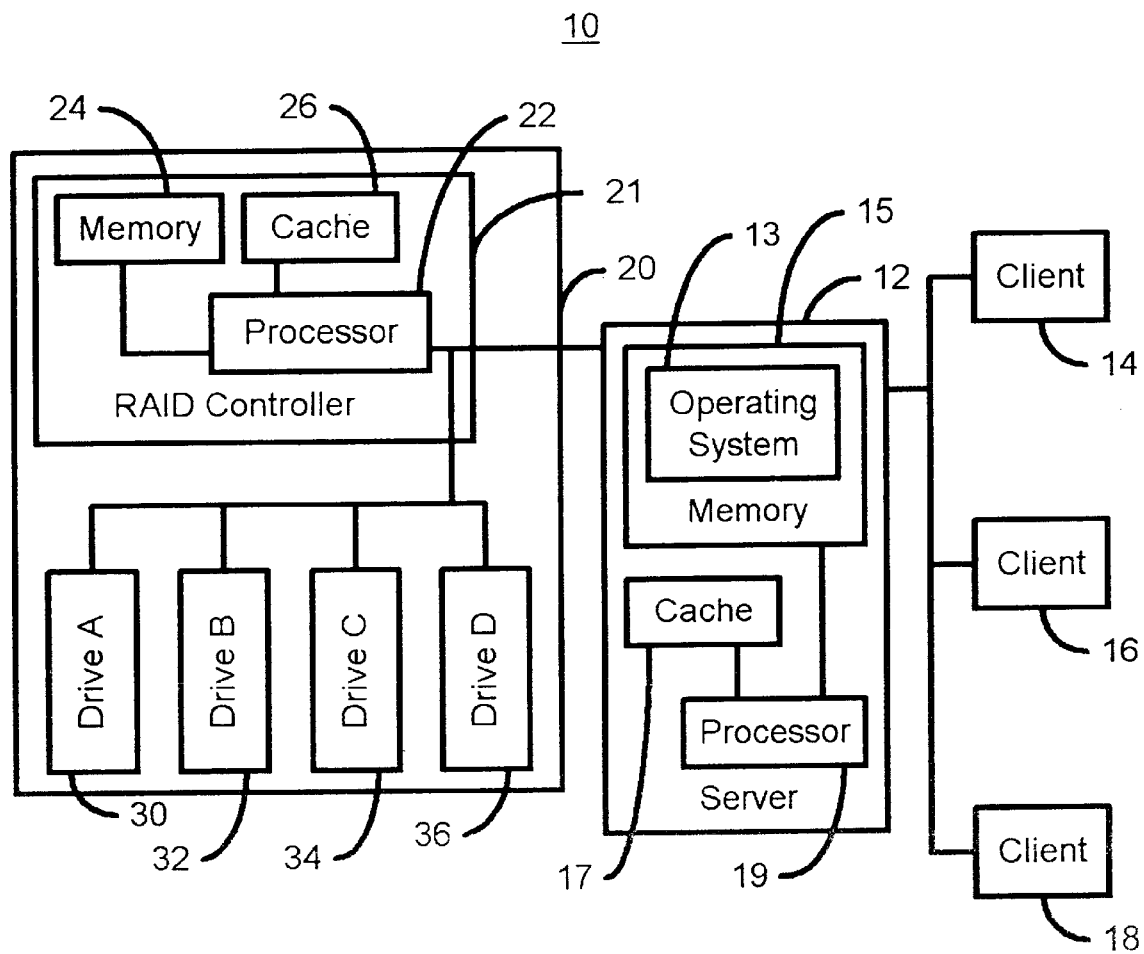
FIG. 1 is a block diagram of a system including a RAID data subsystem.

FIG. 1 is a block diagram of a network 10 in which a RAID subsystem 20 is used for data storage. For clarity, only some features of the system 10 and the RAID subsystem 20 are depicted. The computer system 10 includes a server 12 that services network clients 14, 16, and 18. The server 12 includes an operating system 13, for managing the server 12, residing on a memory 15. The server 12 also includes a cache 17 for rapid access to data and a processor 19 for running the operating system 13, running other applications (not shown), and performing other operations. The RAID subsystem 20 includes a RAID controller 21, and disk drives 30, 32, 34, and 36. Although four drives 30, 32, 34 and 36 are depicted, nothing prevents the use of another number of drives. Typically, bytes or groups of bytes are striped across the drives 30, 32, 34, and 36. The RAID controller 21 includes processor 22, a memory 24, and a RAID cache 26. The memory 24 may include a nonvolatile memory that stores program instructions for operating the RAID controller 21. When the client 14, 16, or 18 desires to use data stored by one of the drives 30, 32, 34, or 36 in the RAID subsystem 20, a portion of the data may be retrieved into the cache 17. A user operating one of the clients 14, 16, or 18 may then modify or read the data stored in the cache 17.

Using the RAID subsystem 20, a great deal of data for the system 10 can be stored relatively inexpensively. Striping data across the drives 30, 32, 34, and 36 improves performance, allowing data to be accessed more rapidly. Furthermore, fault tolerance can be achieved using RAID 1, RAID 2, RAID 3, RAID 4, RAID 5, RAID 6, or RAID 10. Thus, the RAID subsystem 20 is useful.

Figure 2:
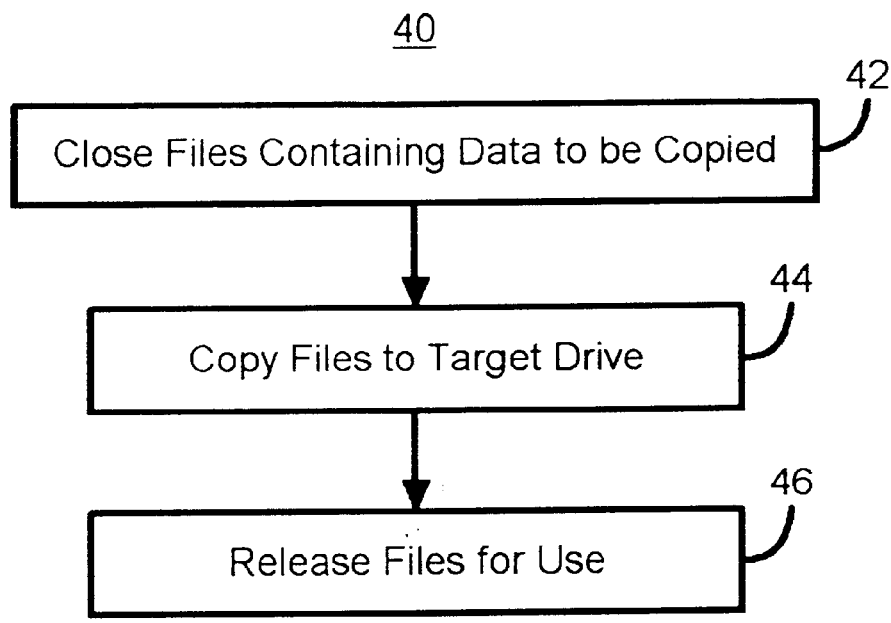
FIG. 2 is a flow chart of a conventional method for copying data from a disk drive in the RAID data subsystem.

It may be desirable to make a copy of the data stored by the RAID subsystem 20. For example, it may be desirable to back up data stored by the RAID subsystem 20. FIG. 2 depicts a conventional method 40 for providing a copy of data stored on the RAID subsystem 20. The files to be copied on the source drive are closed, via step 42. For example, data on the drive A 30 is to be copied, the files on drive A holding the data are closed in step 42. Thus, blocks of data stored on the isolated source drive cannot be read from or written to. This allows a consistent picture of the data to be maintained during copying. A portion of the source drive is then copied, via step 44. When copying is completed, the blocks of data on the source drive and, therefore, the files being copied are released for use, via step 46. Thus, the data on the source drive can be modified or read once copying is complete. A copy of a portion of the source drive or the entire source drive may thus be provided.

Although the conventional shown in FIG. 2 functions, one of ordinary skill in the art will readily realize that the server 12 is precluded from accessing files being copied from the source drive during copying. In many systems, a great deal of data is desired to be copied. For example, the entire drive may be backed up or the file being copied may be a very large database. When such data is copied, the files may be closed for a relatively long period of time. During this time the server 12 cannot access the files. Thus, a user cannot read from or write to the source drive during the copying. However, users of the network 10 may frequently wish to use data stored in the file. For example, if the file being copied is a large database accessed frequently using one or more of the clients 14, 16, or 18 and the server 12, many users may desire access to this file during copying. Refusing to permit access to this data during copying impedes the ability of the server 12 to provide the clients 14, 16, and 18 with the desired information.

To remedy the inability of users to access data during copying, a method for rapidly providing a copy of the data has been disclosed in co-pending U.S. patent application Ser. No. 09/281,561 filed on May 5, 2000 (RP999008/JAS 1264P) and assigned to the assignee of the present application. Applicant hereby incorporates by reference the above-mentioned co-pending U.S. patent application. The method and system disclosed in the above-mentioned co-pending application allow a user to access data being copied almost instantaneously after copying commences. Thus, although actual copying of the data takes time, it appears to a user as though the data has been copied virtually instantaneously.

Figure 3:
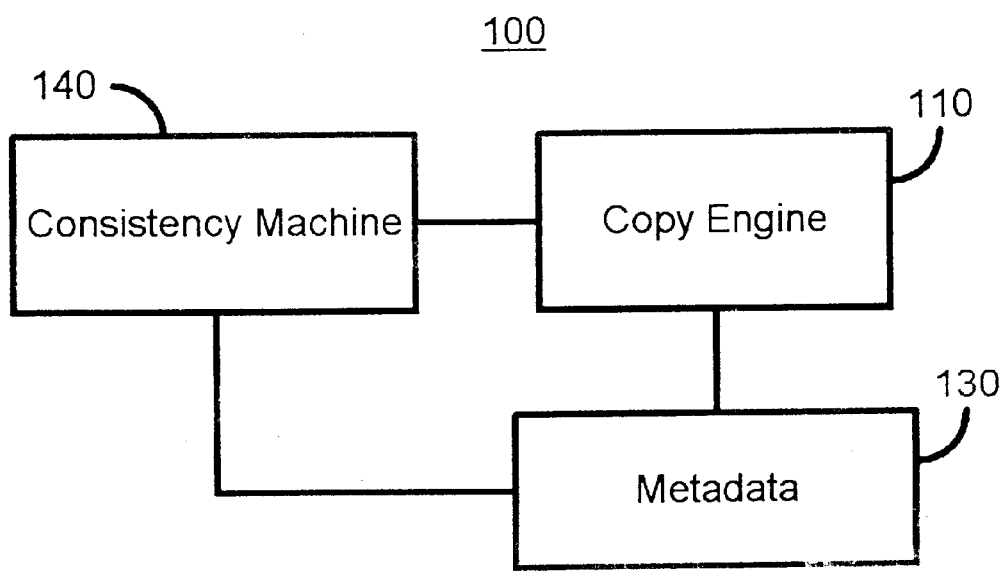
FIG. 3 is a block diagram of a system in accordance with the present invention for rapidly providing a copy of data in a RAID subsystem.

FIG. 3 depicts one embodiment of a system 100 used in rapidly providing a copy of data. The system 100 can be used in conjunction with a system using a RAID subsystem, such as the network 10 and the RAID subsystem 20. The system 100 includes a copy engine 110 coupled with a consistency machine 120, and metadata 130. The copy engine 110, consistency machine 120, and metadata 130 preferably reside on the RAID controller 21. For example, the metadata 130 preferably resides in the nonvolatile memory 24 of the RAID controller 21. The copy engine 110 copies the desired data in the background. Virtually instantaneously after copying is initiated, the files being copied can be accessed using the server 12. The consistency machine 120 ensures that data can be written to or read from the files being copied without adversely affecting the copying process or use of the data. The metadata 130 is used to track changes in the data being copied.

Figure 4:
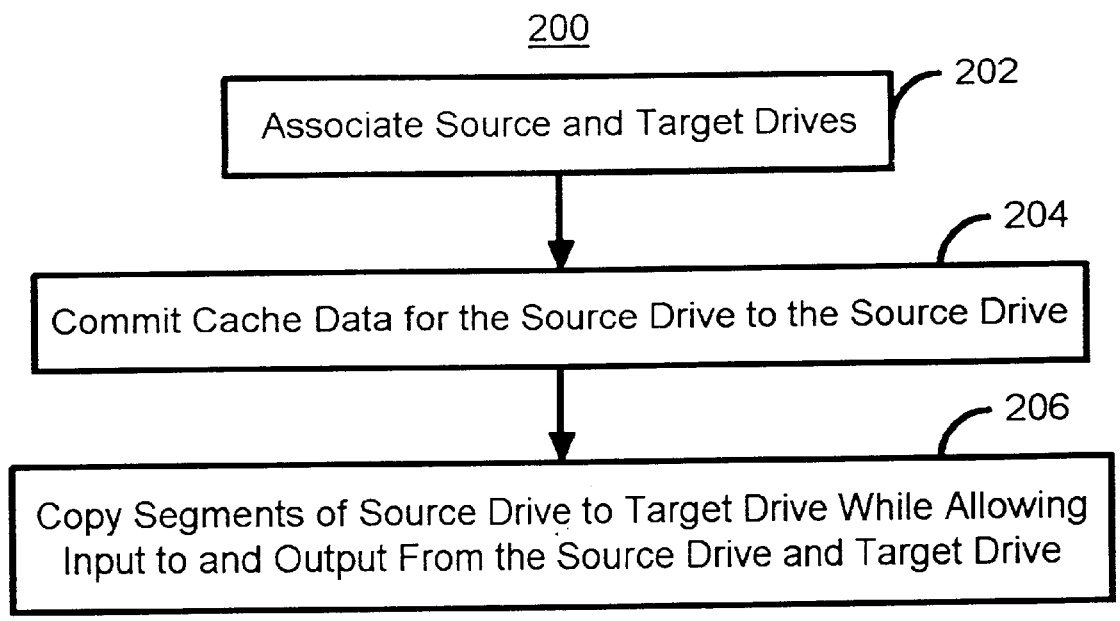
FIG. 4 is a high-level flow chart of a method for rapidly providing a copy of data residing on a drive in a RAID subsystem.

FIG. 4 depicts a high-level flow chart of a method 200 for rapidly copying data on a RAID subsystem 20 in accordance with the present invention. FIG. 4 will be explained with reference to FIG. 1. The data being copied can reside on a portion of a drive 30, 32, 34, or 36 in the RAID subsystem 20. The drive 30, 32, 34, or 36 from which data is being copied is the source drive. The drive 30, 32, 34, or 36 to which data is being copied is the target drive. In a preferred embodiment, the target drive may be any drive which is recognized by the system 10. The source drive is associated with the target drive, via step 202. Thus, the copy engine 110, consistency machine 120, and metadata 130 understand the location of the data being copied and the location to which data is being provided.

Cache data for the source drive is then committed to the source drive, via step 204. In a preferred embodiment, step 204 includes committing data in the cache 17 and data in the cache 26 that is to be stored on the source drive to the source drive. During step 204, there is no input to or output from the files to be copied from the source drive. Thus, in a preferred embodiment, step 204 includes temporarily closing the files on the source drive that include data being copied while cache data is committed. Once the cache data has been committed, the files can be reopened for use. Thus, in a preferred embodiment, step 204 also includes opening the files that include data to be copied once the cache data has been committed to the source drive. Also in a preferred embodiment, step 204 is carried out using the operating system 13 on the server 12.

The data on the source drive is then copied to the target drive while allowing input to and output from the source drive and, in a preferred embodiment, the target drive, via step 206. In a preferred embodiment, step 206 includes copying the data on the source drive block by block.

However, in an alternate embodiment, the data being copied could be segmented into any sized pieces for copying. In a preferred embodiment, the copy of the data provided in step 206 is the data as it existed at approximately the instant copying commenced. Note that the copying step 206 may not take any less time than conventional copying using step 44 of the method 40 depicted in FIG. 2. However, the copying step 206 appears significantly faster to the server 12 and a user because access is very rapidly allowed to the data being copied. In a preferred embodiment, step 206 includes allowing access to the data being copied almost instantaneously after copying commences. In a preferred embodiment, the copying step 206 is performed using the copy engine 110, the consistency machine 120, and the metadata 130 on the RAID controller 20.

Step 206 of the method 200 includes intercepting write requests to ensure that the portion of the source drive that a write request is going to update is copied first to the target drive before the actual update. Thus, the portion of the source drive is copied in segments. This procedure takes some time. If a request to modify a segment is received, it must be ensured that the data in the segment is preserved for the copy before modifications are made.

Figure 5:
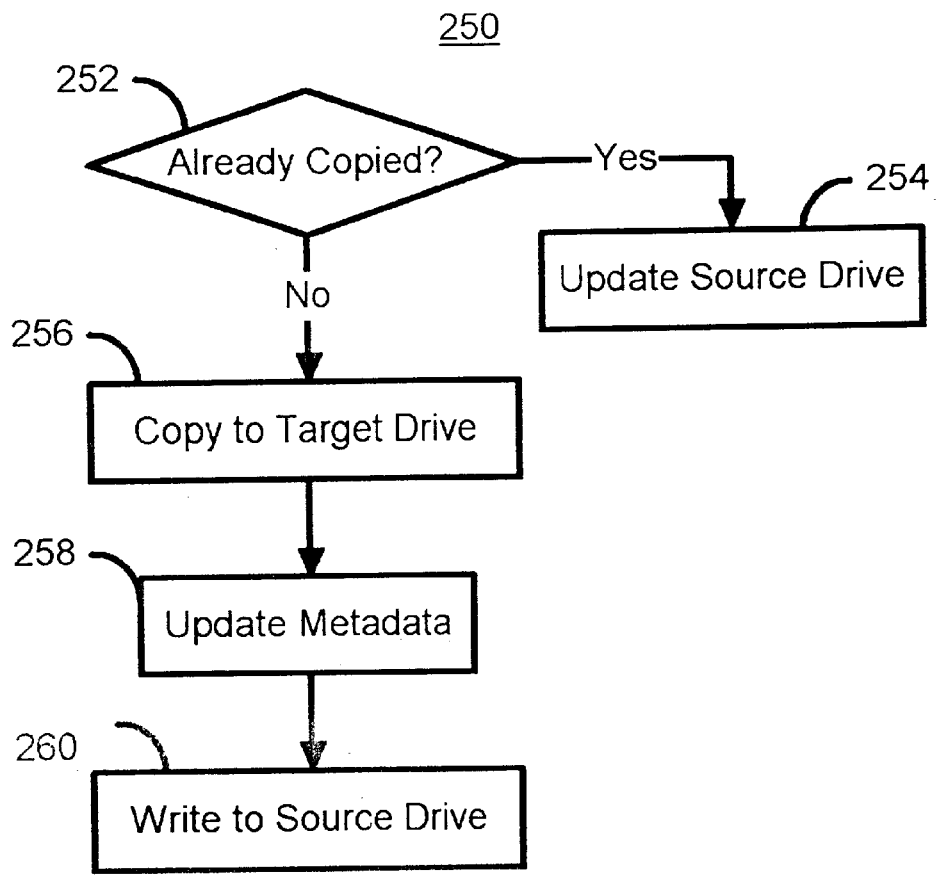
FIG. 5 is a flow chart of a method for processing write requests used in the method for rapidly providing a copy of data residing on a drive in the RAID subsystem.

FIG. 5 depicts a flow chart of a method 250 for processing write requests in accordance with the disclosure of the above-mentioned co-pending application. It is determined if the segment to be modified has already been copied to the target drive, via step 252. If so, then the segment on the source drive can simply be updated, via step 254. If, however, the segment has not been copied to the target drive, then the segment must be preserved in the copy on the target drive. Thus, if the segment has not been copied, that segment is first copied to the target drive, via step 256. The portion of the metadata for that segment is updated to indicate that the segment has been copied, via step 258. Once the segment has been copied to the target drive, the segment is modified on the source drive, via step 260. The segment may thus be copied out of order to allow for input during the copying procedure.

Although the method and system disclosed in the above-mentioned co-pending application function well for their intended purpose, one of ordinary skill in the art will readily recognize that writing the data for a segment that has not been copied requires additional time. When a block being modified has not been copied yet, the method 250 copies the block to the target drive, updates the metadata, and then makes modifications to the block on the source drive. Thus, the block is essentially written twice. In this case, processing the write request for the block takes approximately twice as long as a normal write request. This delay may be noticeable to a user and lengthens what is typically the longest timed input/output cycle.

The present invention provides a method and system for more efficiently providing a copy of a portion of a source drive of a plurality of drives in a redundant array of inexpensive disks (RAID) data storage system. The portion of the source drive includes a plurality of segments. The method and system comprise progressively providing the copy of the plurality of segments from the source drive to the target drive. The plurality of segments can be modified during the step of providing the copy. The method and system further comprise providing another copy of a portion of the plurality of segments that have been modified since the step of providing the copy commenced if a portion of the plurality of segments have been modified since copying commenced. Once this procedure is completed, the copying methods described in the above-mentioned co-pending application may be utilized.

The present invention will be described in terms of a network employing specific elements. However, one of ordinary skill in the art will readily recognize that this method and system will operate effectively in other systems having different components and environments other than networks. The present invention will also be described in the context of providing a backup. However, the present invention could be used to provide a copy for other purposes. Furthermore, the present invention could provide a copy of all or a portion of a drive or to provide a copy of multiple drives.

Figure 6:
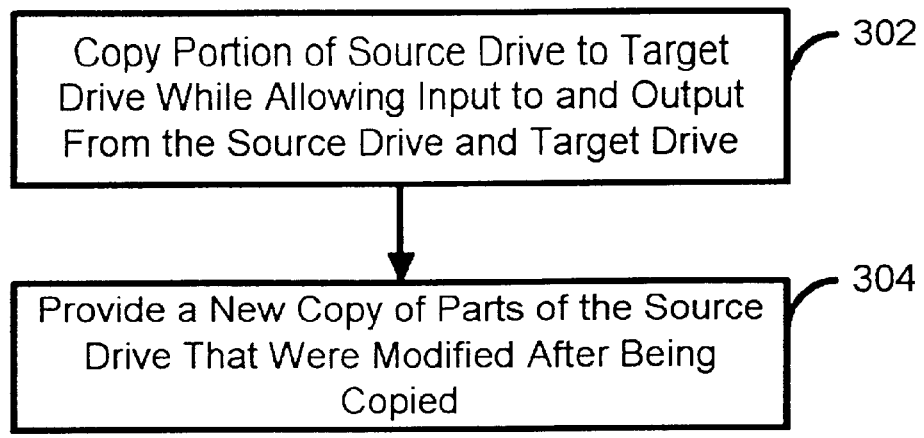
FIG. 6 depicts a high-level flow chart of a method in accordance with the present invention for more efficiently providing a copy.

FIG. 6 depicts a high-level flow chart of a method 300 for more efficiently providing a copy in accordance with the present invention. The method 300 is preferably commenced some time before the method 200 starts. A portion of the source drive is copied while allowing input to and output from the source drive, via step 302. The portion of the source drive copied in step 302 is preferably the portion of the source drive which will be copied using the method 200. Step 302 preferably occurs in the background when the resources of the system 10 are available and is performed using the copy engine 110. Consequently, step 302 does not adversely affect the performance of the system 10.

When step 302 has completed, a copy of the desired portion of the source drive has been provided to the target drive. Because input to and output from the source drive is allowed during step 302, the server 12 and users can use the data on the source drive. However, this also means that copy provided to the target drive may not accurately reflect the current state of the portion of the source drive that was copied. Therefore, a new copy is provided, via step 304. This new copy is a copy of the part of the copied portion of the source drive that has been modified since being copied. Step 304 also preferably occurs in the background when resources of the system 10 are available. Thus, recopying the modified parts of the portion of the source drive does not adversely affect performance of the system. Step 304 also preferably occurs on a second pass through the blocks to be copied.

Figure 7:
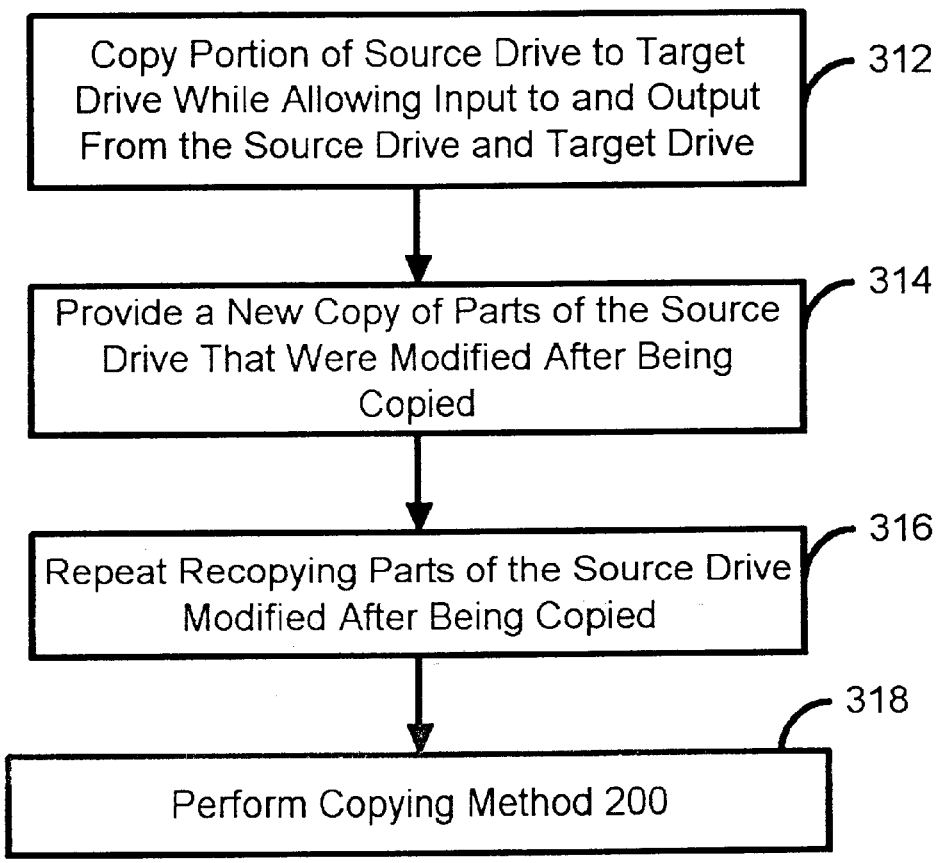
FIG. 7 depicts a more detailed flow chart of a method in accordance with the present invention for more efficiently providing a copy of a portion of the source drive.

FIG. 7 depicts a more detailed flow chart of a method 310 for more efficiently copying a portion of the source drive in accordance with the present invention. Note that although the method 310 is described in terms of "blocks" of data, any segment of data can be used. The portion of the source drive to be copied includes a plurality of blocks. In addition, the method 310 is preferably commenced some time before the method 200 starts. Thus, the blocks in the portion of the source drive are copied from the source drive to the target drive while allowing input to and output from the blocks, via step 312. Step 312 is analogous to step 302 of the method 300 depicted in FIG. 6. Referring back to FIG. 7, the blocks copied in step 312 are preferably in the portion of the source drive which will be copied using the method 200. Step 312 preferably occurs in the background when the resources of the system 10 are available. Consequently, step 312 does not adversely affect the performance of the system 10. Step 312 is also preferably performed using the copy engine 110.

When step 312 has completed, a copy of the desired portion of the source drive has been provided to the target drive. Because input to and output from the source drive is allowed during step 312, the copy provided to the target drive may not accurately reflect the current state of the portion of the source drive that was copied. Therefore, a new copy of the blocks that were copied in step 312 and that were modified since being copied are provided, via step 314. Step 314 can be viewed as a second pass through the data being copied. However, since the part of the source drive recopied in step 314 can be viewed as recopied in a second pass, it should be less than the portion of the source drive originally copied in step 312 because the copying step 312 requires a finite amount of time. Thus, step 314 should require less time than step 312. Step 314 also preferably occurs in the background when resources of the system 10 are available. Thus, recopying the modified parts of the portion of the source drive does not adversely affect performance of the system. Furthermore, because a finite amount of time elapsed since the method 310 commenced, the number of blocks copied in step 314 may be less than the number of blocks copied in step 312.

The recopying step is then repeated for any blocks that have been modified since being copied, via step 316. Thus, more passes through the data to be copied are made in step 316. Because step 314 should take less time than step 312, the part of the source drive recopied in step 316 should be less than the portion of the source drive originally copied in step 314. Step 314 preferably repeats copying blocks that have been modified until some condition is satisfied. For at least a portion of the time that step 314 repeats, the amount of time for each recopying step should decrease. The number of blocks recopied should also decrease for at least a portion of the time that the recopying is repeated. In one embodiment, a particular amount of time elapsing is the condition that terminates recopying modified blocks. In a preferred embodiment, step 314 repeats copying the modified blocks until it is determined that nothing can be gained by continuing to recopy the blocks. For example, the copying process is repeated until it is determined that the number of blocks being recopied each time step 314 repeats stays relatively constant. In such a case, the number of blocks changed during the recopying procedure is approximately the same as the number of blocks being recopied. The method 200 may then be carried out to provide copies of the remaining blocks for which a current copy is not available while allowing input to and output from the source and target drives, via step 318. Thus, the remaining modified blocks are copied in step 318.

In a preferred embodiment, the copy provided by the method 310 accurately depicts the portion of the source drive when the step 318 commences. Consistent with the method 200, modifications made to the portion of the source drive being copied after step 318 starts are not reflected in the copy. Because portions of the source drive are copied in steps 312 through 316, less than all of the blocks in the portion of the source drive may be copied in step 318. As a result, there is a smaller probability that a write request received during the step 318 will result in a block being copied and modified. Thus, delays to input may be reduced.

Figure 8A:
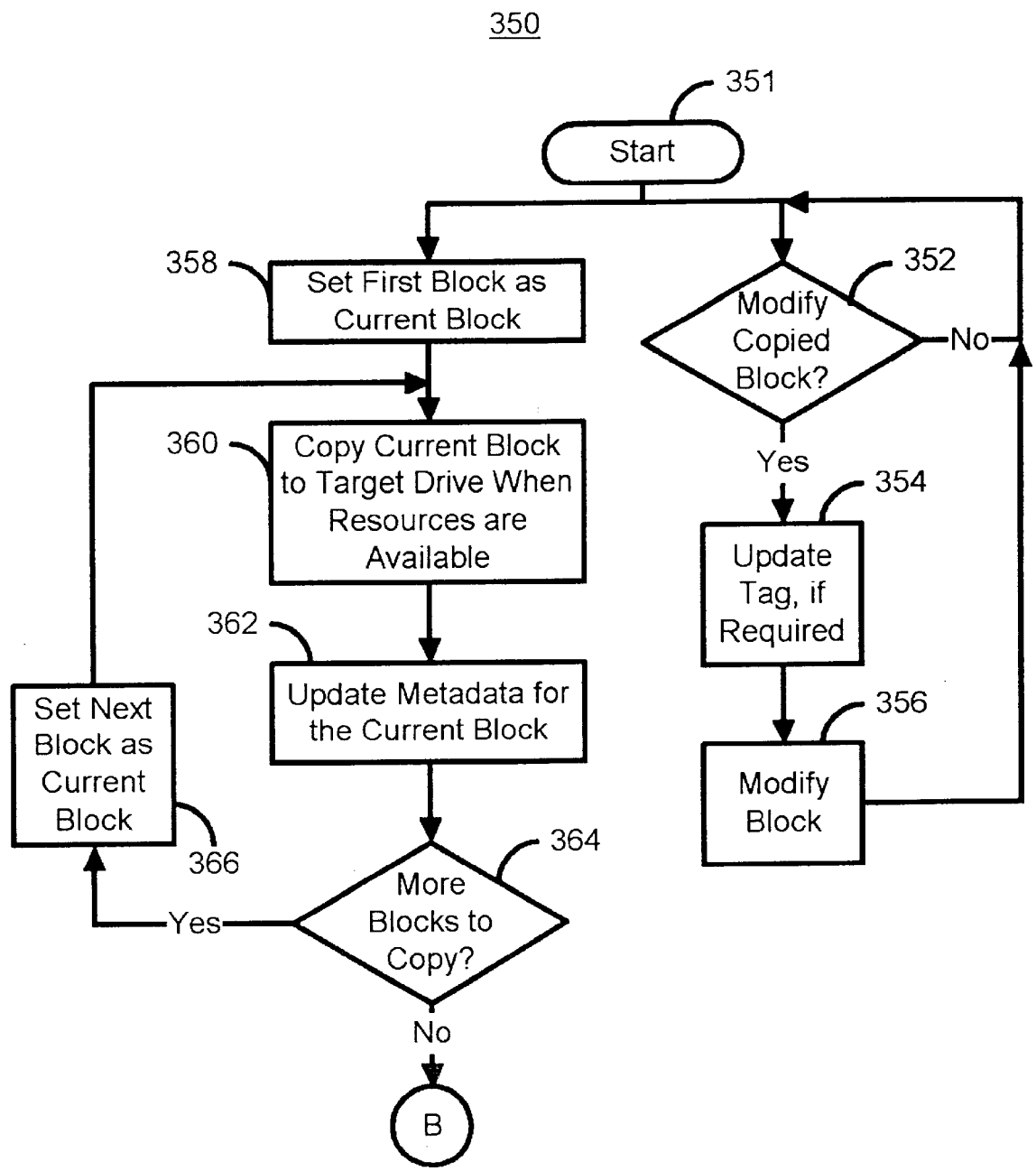
FIGS. 8A and 8B is a detailed flow chart of a preferred embodiment of a method in accordance with the present invention for more efficiently providing a copy of a portion of the source drive.
Figure 8B:
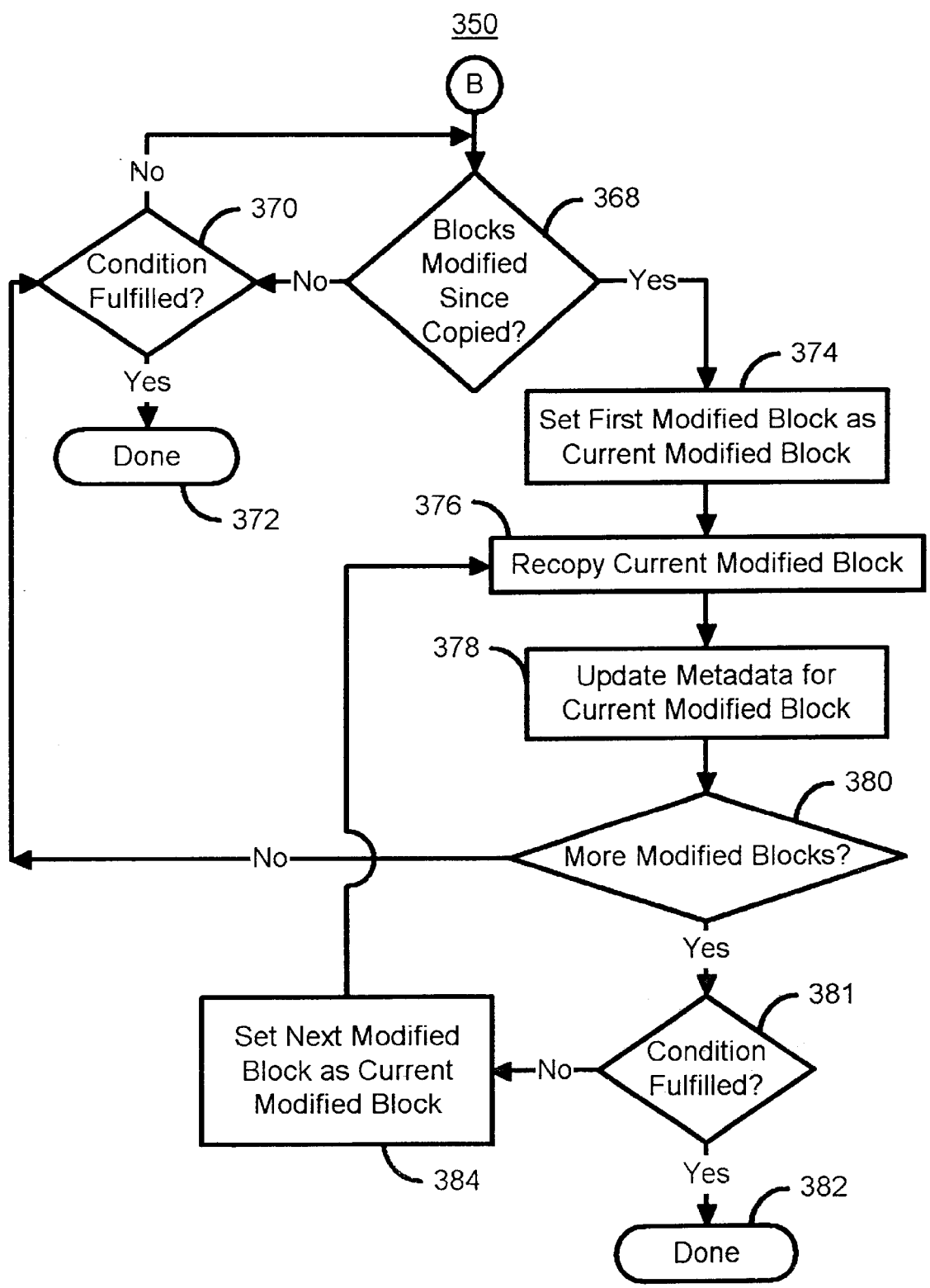

To more fully illustrate the method and system in accordance with the present invention, refer to FIGS. 8A and 8B, depicting a detailed flow chart of one embodiment of a method 350 in accordance with the present invention. The method 350 commences at start block 351. In one embodiment, step 351 includes commanding the RAID controller 21 to start the copying process, preferably in anticipation of the method 200 being performed. As the copying process, discussed below, is being performed, modifications can be made to the blocks being copied. Thus, it is determined in step 352 whether a request to modify one of the blocks to be copied is received, via step 354. If not, the step 352 simply repeats. If a request to modify a block is received, then the metadata 130 for the block is updated if necessary, via step 354. In a preferred embodiment, the metadata 130 includes a tag for each block to be copied. When the block is copied, the tag is set, for example to a one.

A block that is to be copied has a tag of zero. Thus, in a preferred embodiment, step 354 includes resetting the tag for the block which is to be modified to a zero. This indicates that the block is to be copied again. The block is rewritten, via step 356. Once the block is modified in step 356, step 352 is returned to, allowing additional write requests to be received.

After the method starts in step 351, a first block is also set as the current block, via step 358. The current block is then copied when resources of the system 10 are available, via step 360. The metadata for the current block is then updated, via step 362. In a preferred embodiment, step 362 includes setting the tag for the current block to a one, indicating that the current block has been copied. It is then determined whether there are more blocks to copy, via step 364. If there are more blocks to be copied, then the next block is set to be the current block, via step 366. Steps 360 through 366 may then be repeated until the blocks are all copied.

It is determined whether there are any blocks which have been modified since being copied to the target drive, via step 368. In a preferred embodiment, step 368 is performed by determining whether the tag for any block is a zero. The tag for the modified block will be zero because it has been reset in step 354. If there are no modified blocks to be recopied, then it is determined whether the condition which will terminate the process has occurred, via step 370. In one embodiment, it is determined whether a particular time has elapsed in 370. In a preferred embodiment, it is determined whether the number of blocks being recopied stays relatively constant in step 370. If the condition is satisfied, then the method terminates in step 370 and the method 200 may commence. Otherwise, the method returns to step 368 of determining whether there are blocks that have been modified since being copied.

If it is determined in step 368 that there are blocks which have been modified since being copied, then the first modified block is set as the current block, in step 374. The current modified block is then recopied, via step 376. The metadata for the block that was recopied is then updated, via step 378. In a preferred embodiment, step 378 includes setting the tag for the recopied block to a one, indicating that the block has been copied. It is then determined whether there are additional blocks that were modified and thus are to be recopied, via step 380. In a preferred embodiment, step 380 includes determining a next tag for a next modified block that was reset in step 354. If there are additional modified blocks to be recopied, it is determined whether the condition has been satisfied, via step 381. If so, then the method terminates and the methods 200 may commence, via step 382.

If the condition has not been satisfied, then the next block to be recopied is set as the current modified block, via step 384. Steps 376 through 384 may then be repeated until all of the modified blocks are recopied. Thus, the copies of the modified blocks are updated to include changes to the modified blocks. Steps 376 through 384 may also be repeated so that the tags in the metadata are traversed multiple times. Thus, a block may be modified and recopied multiple times.

When it is determined that there are no modified blocks have been recopied, it is determined whether the condition has been satisfied in step 370. If the condition has not been satisfied, then steps 368 through 374 are repeated until the condition is satisfied. Otherwise, the method terminates in step 372.

Figure 9A:
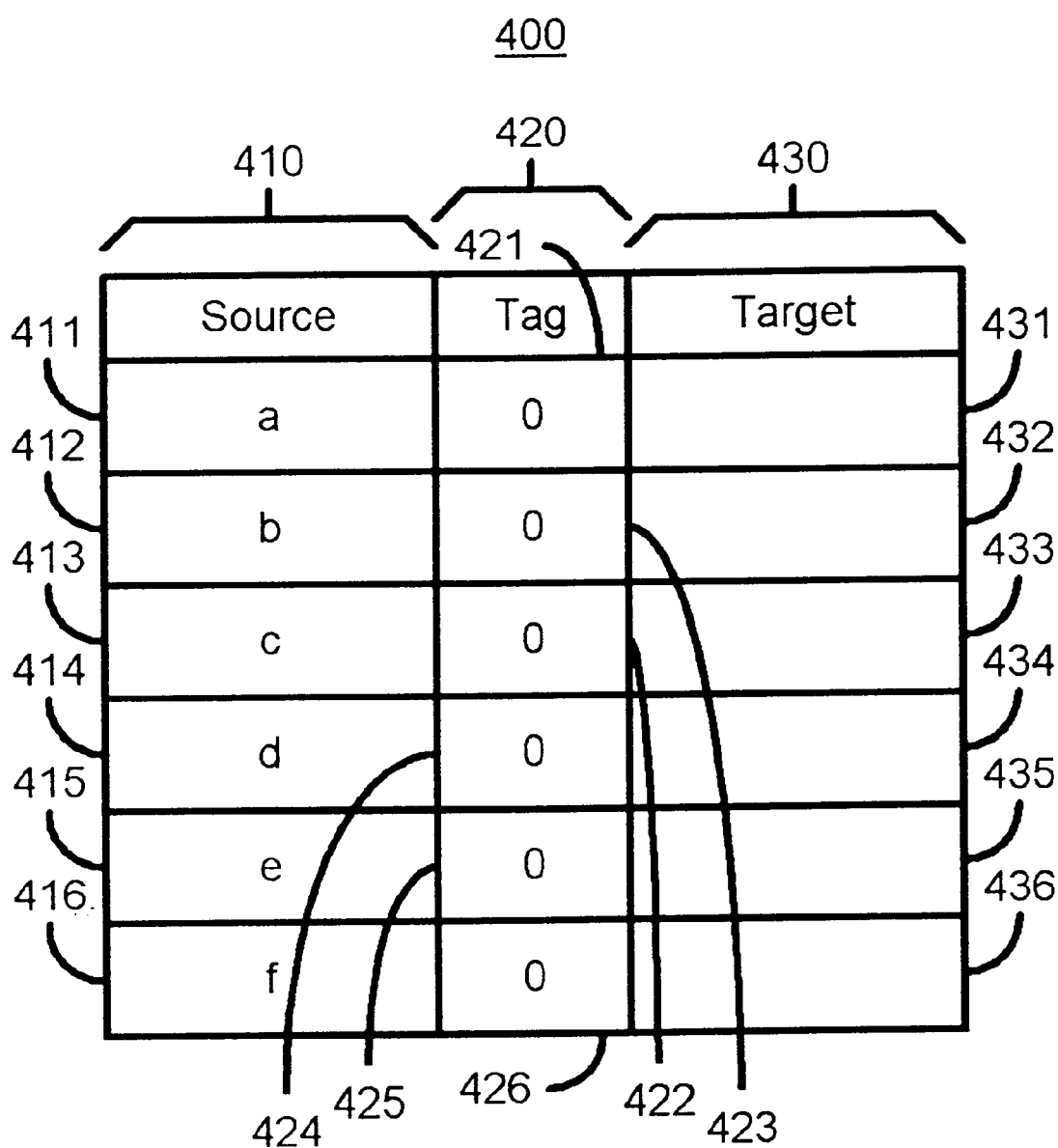
FIG. 9A is a block diagram of metadata for the source and target drives at the time the copy of the source drive is to be made.

FIGS. 9A through 9D depict the states of the metadata 130, source drive, and target drive during various times after the method 300, 310, or 350 has been initiated. Referring now to FIG. 9A, the states 400 is depicted at time to, when the copying procedure has just been initiated. Thus, source 410 and target 430 drives have been defined. The metadata, or tags 420 for six blocks 411–416 to be copied, blocks holding data a, b, c, d, e, and f, have been determined. The tags 420 have also been determined. The tags 421 through 426 corresponding to blocks a 411 through f 416 have been set as zeroes. This is because none of the blocks 411–416 have been copied.

Figure 9B:
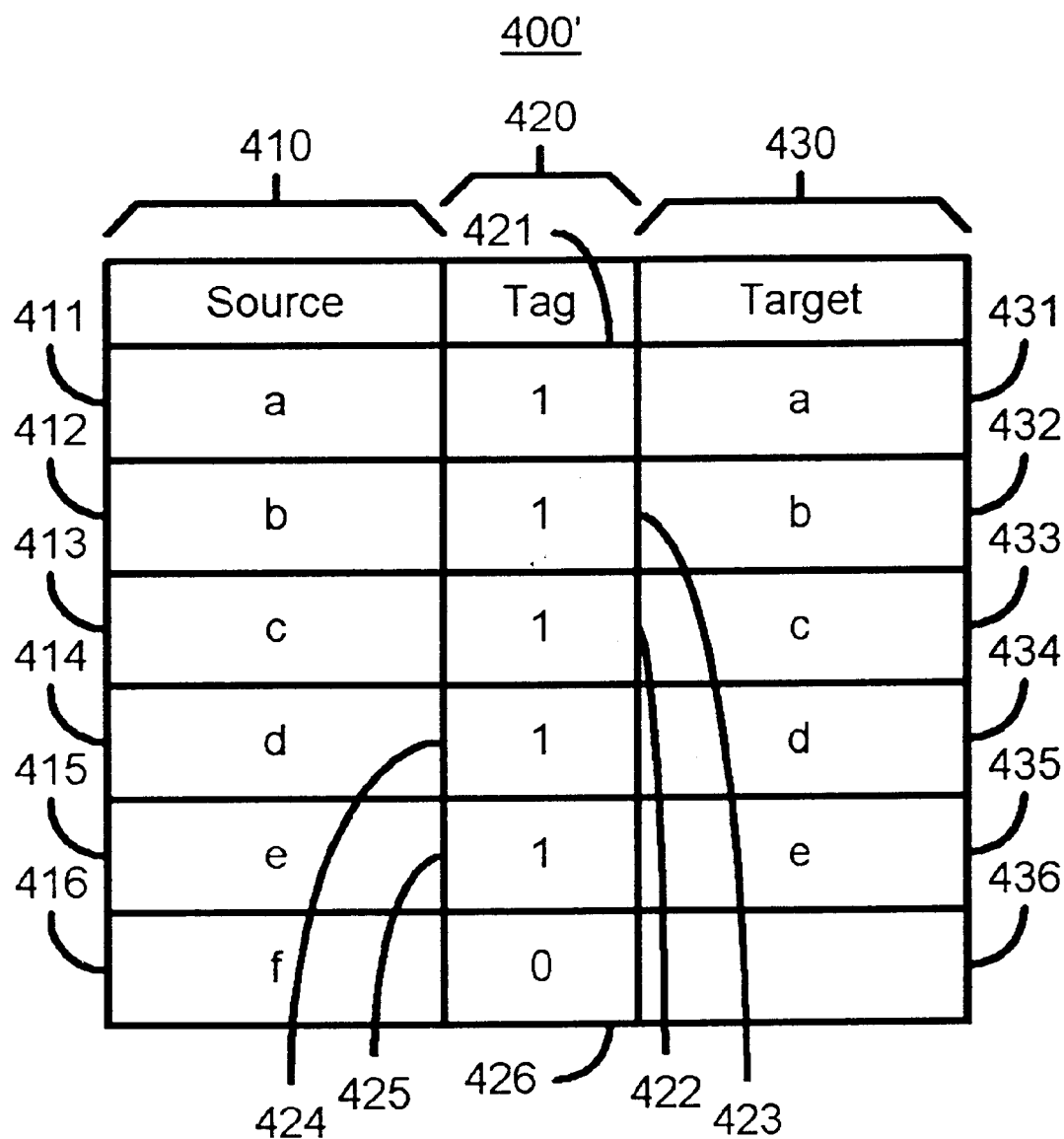
FIG. 9B is a block diagram of metadata for the source and target drives after the copy of the some of the blocks on the source drive have been made.

FIG. 9B depicts the state 400' of the source drive 410, tags 420, and target drive 430 at time $t_1$, when the first five blocks 411–415 in the source drive 410 have been copied to the first five blocks 431–435 in the target drive 430. Thus, the tags 421–426 for the first five blocks 411–415 have been changed to ones. This change reflects the fact that these blocks 411–415 have been copied. Because the remaining block 416 has not been copied, the corresponding tag 426 remains a zero.

Figure 9C:
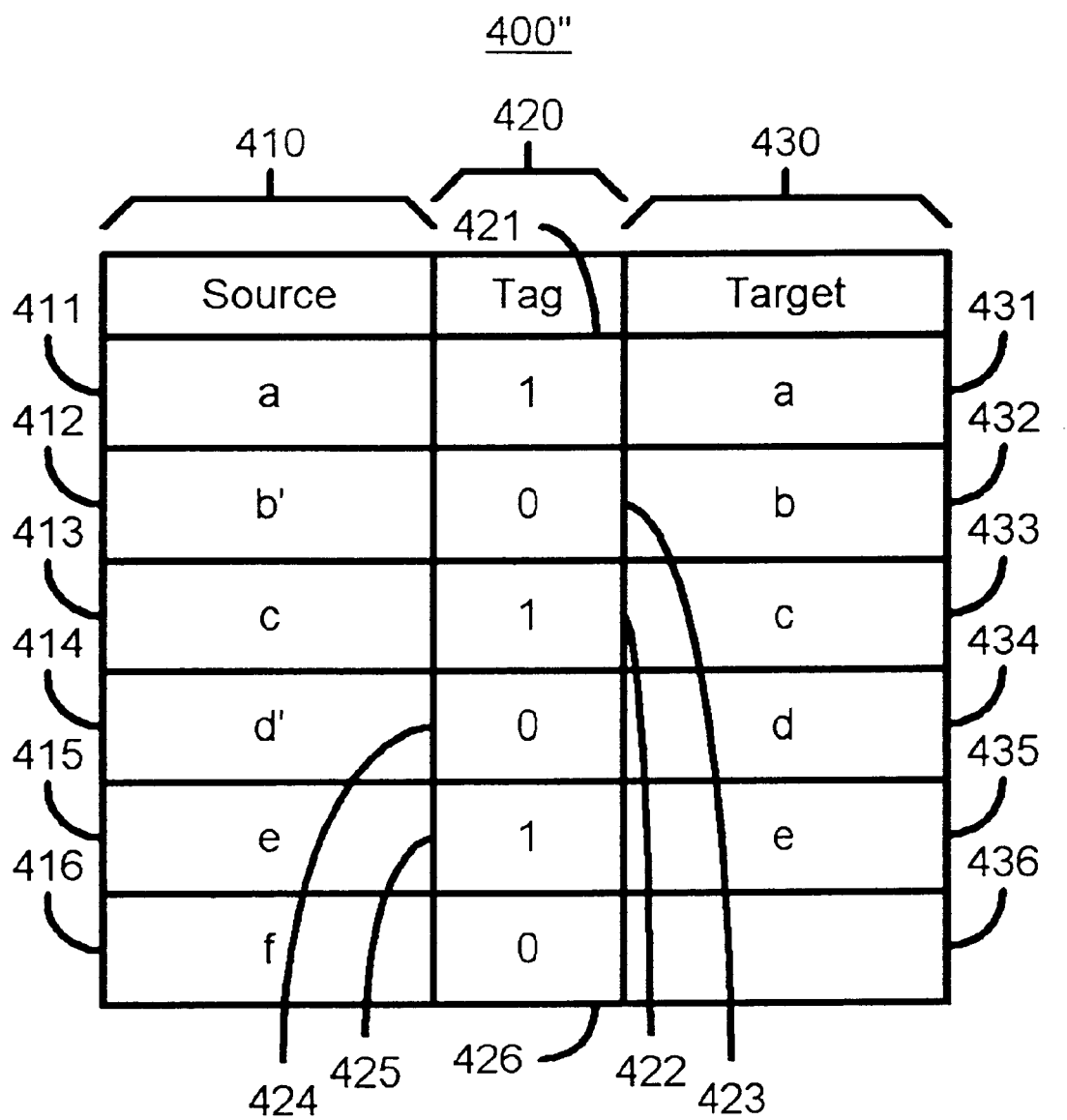
FIG. 9C is a block diagram of metadata for the source and target drives just after blocks which have been copied are modified.

FIG. 9C depicts the state 400'' of the source drive 410, tags 420, and target drive 430 at time $t_2 > t_1$ when requests to write to the second block 412 and the fourth block 414 have been received and processed in accordance with the method 250. The first block 411, third block 413, and the fifth block 415 in the source drive 410 have been copied to the first block 431, the third block 433, and the fifth block 435, respectively, in the target drive 430. Furthermore, the corresponding tags 421, 423, and 425 are ones. The second block 412 on the source drive 410 has been modified to hold data b' because of the write request. In addition, the tag 422 for the fourth block 412 is changed to reflect that the fourth block 412 has been rewritten. The fourth block 414 on the source drive 410 has been modified to hold data d' because of the write request. In addition, the tag 424 for the fourth block 414 is changed to reflect that the fourth block 414 has been rewritten.

Figure 9D:
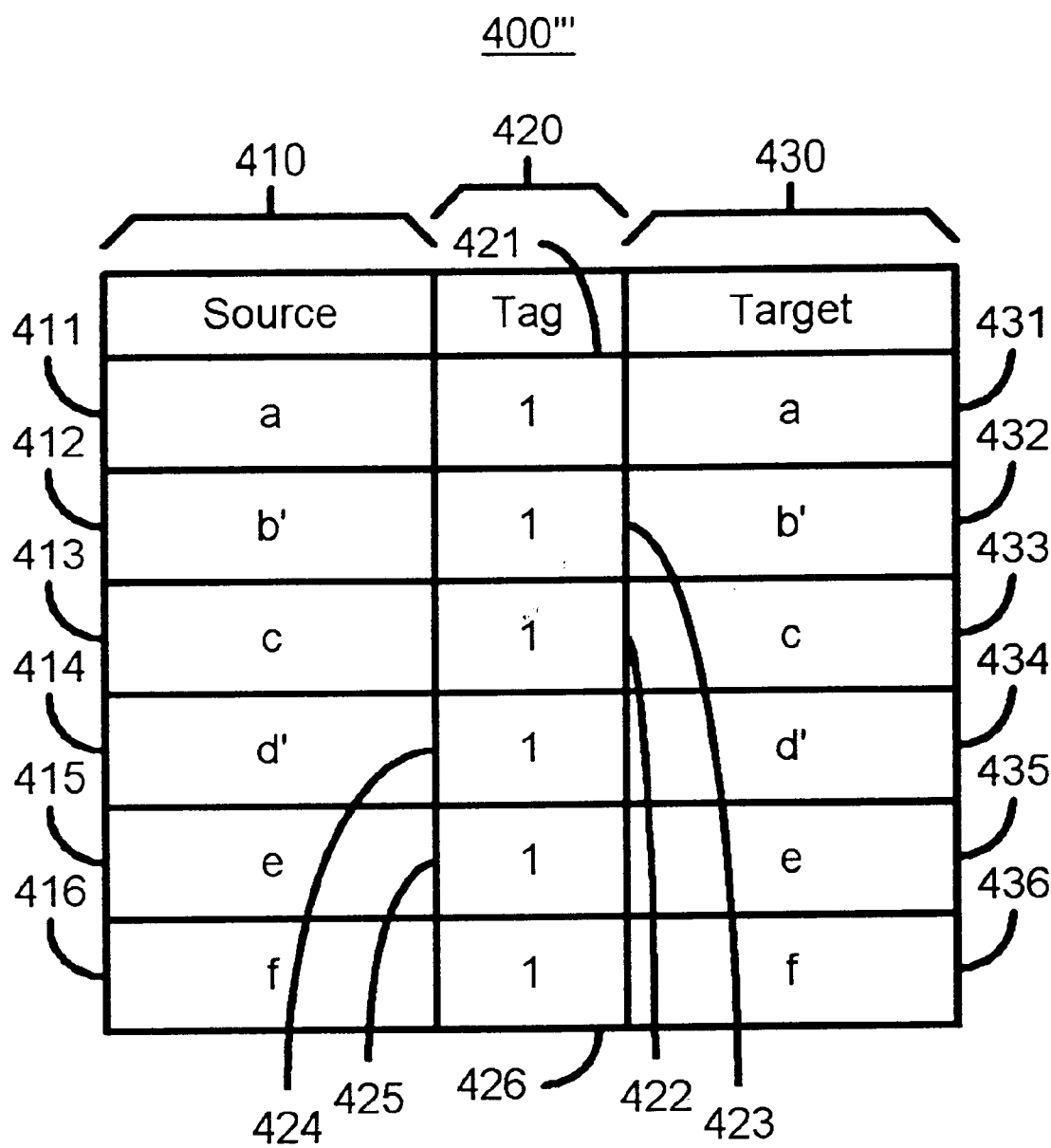
FIG. 9D is a block diagram of metadata for the source and target drives after the modified blocks have been recopied.

FIG. 9D depicts the state 400''' of the source drive 410, tags 420, and target drive 430 at time $t_3 > t_2$ when the modified blocks have been recopied in accordance with the method 300, 310, or 350. Because the first pass through the blocks to be copied has already been completed, the sixth block 416 on the source drive 410 has also been copied to the sixth block 436 on the target drive 430. Because another pass through the data has been completed, the second block 412 and fourth block 414 on the source drive 410 have been recopied to the second block 432 and the fourth block 434. Thus, the second bock 432 and the fourth block 434 hold data b' and d', respectively. The second block 412 and fourth block 414 have been recopied because the tags 422 and 424 indicated that the second block 412 and the fourth block 414 had been modified. Thus, the tags 420 in the metadata 130 track changes in the data. The copy on the target drive 430 is then updated in response to changes in the source drive.

Thus, the method 300, 310, or 350 provides a copy of the desired portion of the source drive and continues to update the copy as data on the source drive are modified. Thus, the method 200 the number of blocks which have been modified since the last copy was provided to the target drive may be less than the total number of blocks in the portion of the source drive to be copied. Thus, the number of blocks to be copied using the method 200 may be reduced. The probability that a write request is for a block that is to be copied is also reduced. Consequently, time to process most write requests is reduced. Once the method 300, 310, or 350 is provided, the copying process discussed with respect to FIGS. 3, 4, and 5 can be provided. The copying process discussed with respect to FIGS. 3, 4 and 5 should take less time and have reduced delays for write requests for the reasons discussed above.

A method and system has been disclosed for more efficiently providing a copy of data on a RAID subsystem. In a preferred embodiment, the copy is provided relatively instantaneously. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claim is:

1. A method for copying a portion of a source drive to a target drive, the source drive and the target drive being part of a plurality of drives in a redundant array of inexpensive disks (RAID) data storage system, the portion of the source drive including a plurality of segments, the method comprising the steps of:

(a) providing a copy of the plurality of segments from the source drive to the target drive, wherein the plurality of segments can be modified during the step of providing the copy;

(b) providing another copy of a portion of the plurality of segments that have been modified since being copied if the portion of the plurality of segments have been modified; and (c) providing a copy of each of a second portion of the plurality of segments for which a current copy had not been provided, if any, while allowing input to and output from the source drive and the target drive.

2. The method of claim 1 further comprising the step of:

(c) repeating step (b) for a predetermined period of time.

3. The method of claim 1 further comprising the step of:

(c) repeating step (b) until a number of segments in the portion of the plurality of segments that have been modified does not substantially decrease.

4. The method of claim 1 wherein the copying step (a) further includes the steps of:

(a1) copying a segment of the plurality of segments;

(a2) indicating that the segment has been copied; and (a3) repeating steps (a1) and (a2) for each remaining segment in the plurality of segments.

5. The method of claim 4 wherein the copying step (a) further includes the steps of:

(a4) indicating whether the portion of the plurality of segments have been modified since the step of providing the copy commenced.

6. The method of claim 5 wherein the copy indicating step (a2) further includes the step of:

(a2i) providing a tag associated with each of the plurality of segments, the tag indicating whether a copy of the segment has been provided to the target drive.

7. The method of claim 6 wherein the modification indicating step (a4) further includes the step of:

(a4i) resetting the tag for each of the portion of the plurality of segments to indicate that the portion of the plurality of segments is to be copied again.

8. A method for copying a portion of a source drive to a target drive, the source drive and the target drive being part of a plurality of drives in a redundant array of inexpensive disks (RAID) data storage system, the portion of the source drive including a plurality of segments, the method comprising the steps of:

(a) providing a copy of the plurality of segments from the source drive to the target drive, wherein the plurality of segments can be modified during the step of providing the copy;

(b) providing another copy of a portion of the plurality of segments that have been modified since being copied if the portion of the plurality of segments have been modified; and (c) providing a copy of each of a second portion of the plurality of segments for which a current copy had not been provided while allowing input to and output from the source drive and the target drive, the step of providing the copy of the second portion of the plurality of segments further including the steps of:

(c1) if modifications are to be made to a segment of the plurality of segments and a copy of the segment has not been provided yet, providing the copy of the segment to the target drive, indicating that the copy of the segment has been provided, and making the modifications to the segment in the source drive;

(c2) if modifications are to be made to a segment and the copy of the segment has already been provided, making the modifications to the segment in the source drive;

(c3) providing the segment from the source drive if the segment is requested for reading and it is indicated that the copy of the segment has not been provided on the target drive;

(c4) providing the segment from the source drive if the segment is requested for reading and modifications have not been made to the segment since the step of providing the copy (c) commenced;

(c5) providing the segment from the source drive if the segment is requested for reading, the modifications have been made to the segment since the step of providing the copy commenced, and the modifications are desired; and (c6) providing the copy of the segment from the target drive if the segment is requested for reading, modifications have been made to the segment since the step of providing the copy commenced, and the modifications are desired.

9. A system for copying a portion of a source drive to a target drive, the source drive and the target drive being part of a plurality of drives in a redundant array of inexpensive disks (RAID) data storage system, the portion of the source including a plurality of segments, the system comprising:

a copy engine coupled with the source drive and the target drive for providing a copy of the plurality of segments from the source drive to the target drive, for allowing the plurality of segments to be modified during the step of providing the copy, and for providing another copy of a portion of the plurality of segments that have been modified since providing the copy commenced if a portion of the plurality of segments have been modified since copying commenced, wherein the copy engine further provides a copy of a second portion of the plurality of segments for which a current copy has not been provided, if any, while allowing input to and output from the source drive and the target drive; and metadata coupled with the copy engine including an indication of whether the copy of the plurality of segments has been provided to the target drive and whether a portion of the plurality of segments has been modified since copying commenced.

10. The system of claim 9 wherein the copy engine further repeats providing another copy of a portion of the plurality of segments that have been modified for predetermined period of time.

11. The system of claim 9 wherein the copy engine further repeats providing another copy of a portion of the plurality of segments that have been modified until a number of segments in the portion of the plurality of segments that have been modified does not substantially decrease.

12. The system of claim 9 wherein the copy engine further copies a segment of the plurality of segments, indicates in the metadata that the segment has been copied, and repeats the copying and indicating steps for each remaining segment in the plurality of segments.

13. The system of claim 12 wherein the metadata further includes an indication of whether the portion of the plurality of segments have been modified since the step of providing the copy commenced.

14. The system of claim 13 wherein the metadata further includes a tag associated with each of the plurality of segments, the tag indicating whether a copy of the segment has been provided to the target drive.

15. The system of claim 14 wherein the indication of whether the tag for the portion of the plurality of segments have been modified is reset to indicate that the portion of the plurality of segments is to be copied again.

16. A system for copying a portion of a source drive to a target drive, the source drive and the target drive being part of a plurality of drives in a redundant array of inexpensive disks (RAID) data storage system, the portion of the source including a plurality of segments, the system comprising:

a copy engine coupled with the source drive and the target drive for providing a copy of the plurality of segments from the source drive to the target drive, for allowing the plurality of segments to be modified during the step of providing the copy, and for providing another copy of a portion of the plurality of segments that have been modified since providing the copy commenced if a portion of the plurality of segments have been modified since copying commenced, wherein the copy engine further provides a copy of a second portion of the plurality of segments for which a current copy has not been provided while allowing input to and output from the source drive and the target drive;

metadata coupled with the copy engine including an indication of whether the copy of the plurality of segments has been provided to the target drive and whether a portion of the plurality of segments has been modified since copying commenced; and a consistency machine coupled with the source drive and the target drive, the consistency machine for intercepting a write request for modifications to be made to a segment of the plurality of segments, in response to the write request, the consistency machine further for providing a copy of the segment on the target drive if the copy has not been provided yet, indicating that the copy of the segment has been provided if the copy has not been providing yet, and making the modifications to the segment in the source drive after the copy has been provided;

the consistency machine further for making the modifications to the segment in the source drive in response to the request if the copy of the segment has been provided; and the consistency machine further for intercepting a read request for the segment and in response to the read request, providing the segment from the source drive if it is indicated that a copy of the segment has not been provided on the target drive, providing the segment from the source drive if the modifications have not been made to the segment since the step of providing the copy commenced, providing the segment from the source drive if the modifications have been made to the segment since the step of providing the copy commenced and the modifications are desired, and providing the copy of the segment from the target drive if modifications have been made to the segment since the copy was provided and the modifications are not desired.

\* \* \* \* \*